United States Patent
Kwon et al.

(10) Patent No.: US 10,080,014 B2
(45) Date of Patent: Sep. 18, 2018

(54) APPARATUS FOR DISPLAYING IMAGE, DRIVING METHOD THEREOF, AND METHOD FOR DISPLAYING IMAGE THAT ALLOWS A SCREEN TO BE NATURALLY CHANGED IN RESPONSE TO DISPLAYING AN IMAGE BY CHANGING A TWO-DIMENSIONAL IMAGE METHOD TO A THREE-DIMENSIONAL IMAGE METHOD

(71) Applicant: SAMSUNG ELECTRONICS CO., LTD., Suwon-si (KR)

(72) Inventors: Hyuk-joong Kwon, Suwon-si (KR); Hyun-soo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 587 days.

(21) Appl. No.: 14/324,576

(22) Filed: Jul. 7, 2014

(65) Prior Publication Data
US 2015/0195514 A1 Jul. 9, 2015

(30) Foreign Application Priority Data
Jan. 6, 2014 (KR) .................. 10-2014-0001425

(51) Int. Cl.
*H04N 13/00* (2018.01)
*H04N 13/359* (2018.01)
(Continued)

(52) U.S. Cl.
CPC ......... *H04N 13/359* (2018.05); *H04N 13/004* (2013.01); *H04N 13/007* (2013.01);
(Continued)

(58) Field of Classification Search
CPC ............. H04N 13/0029; H04N 13/004; H04N 13/007; H04N 13/0454; H04N 13/0456; H04N 21/485; H04N 21/816
(Continued)

(56) References Cited

U.S. PATENT DOCUMENTS

| | | | |
|---|---|---|---|
| 2007/0058933 A1* | 3/2007 | Kobayashi | H04N 21/23614 386/248 |
| 2007/0236493 A1* | 10/2007 | Horiuchi | H04N 5/265 345/419 |
| 2011/0122126 A1* | 5/2011 | Han | H04N 13/0454 345/419 |
| 2011/0199371 A1* | 8/2011 | Goto | G06F 3/1454 345/419 |

(Continued)

FOREIGN PATENT DOCUMENTS

| | | |
|---|---|---|
| EP | 1 628 490 A1 | 2/2006 |
| EP | 2 464 126 A1 | 6/2012 |

OTHER PUBLICATIONS

Extended European Search Report dated Jun. 22, 2015 in corresponding European Patent Application No. 14179003.0.
(Continued)

*Primary Examiner* — Francis G Geroleo
(74) *Attorney, Agent, or Firm* — Staas & Halsey LLP

(57) ABSTRACT

An image display apparatus, a driving method thereof, and an image display method are provided. The image display apparatus includes an image input unit configured to allow an image signal to be input, an image processor configured to process the input image signal, and a display unit configured to display the processed image signal. The image processor acquires at least one image from the input image and outputs the acquired image in a generation duration time period of an image of which an image output method is changed in response to a change of the image output method of the input image signal.

20 Claims, 8 Drawing Sheets

(51) Int. Cl.
*H04N 13/04* (2006.01)
*H04N 21/81* (2011.01)
*H04N 21/485* (2011.01)
*H04N 13/139* (2018.01)
*H04N 13/156* (2018.01)
*H04N 13/183* (2018.01)
*H04N 13/361* (2018.01)

(52) U.S. Cl.
CPC ..... *H04N 13/0029* (2013.01); *H04N 13/0454* (2013.01); *H04N 13/0456* (2013.01); *H04N 13/139* (2018.05); *H04N 13/156* (2018.05); *H04N 13/183* (2018.05); *H04N 13/361* (2018.05); *H04N 21/485* (2013.01); *H04N 21/816* (2013.01)

(58) Field of Classification Search
USPC .......................................................... 348/43
See application file for complete search history.

(56) References Cited

U.S. PATENT DOCUMENTS

| | | | | |
|---|---|---|---|---|
| 2012/0147135 | A1* | 6/2012 | Matsubara | H04N 13/007 348/43 |
| 2013/0182072 | A1* | 7/2013 | Seo | H04N 13/004 348/43 |
| 2013/0291017 | A1* | 10/2013 | Cho | H04N 13/007 725/45 |
| 2015/0178981 | A1* | 6/2015 | Kozak | G09G 3/003 382/162 |

OTHER PUBLICATIONS

European Patent Office issued Examination Report, Communication pursuant to Article 94(3) EPC, in European Patent Application No. 14 179 003.0 dated Jul. 17, 2018 (6 pages).

* cited by examiner

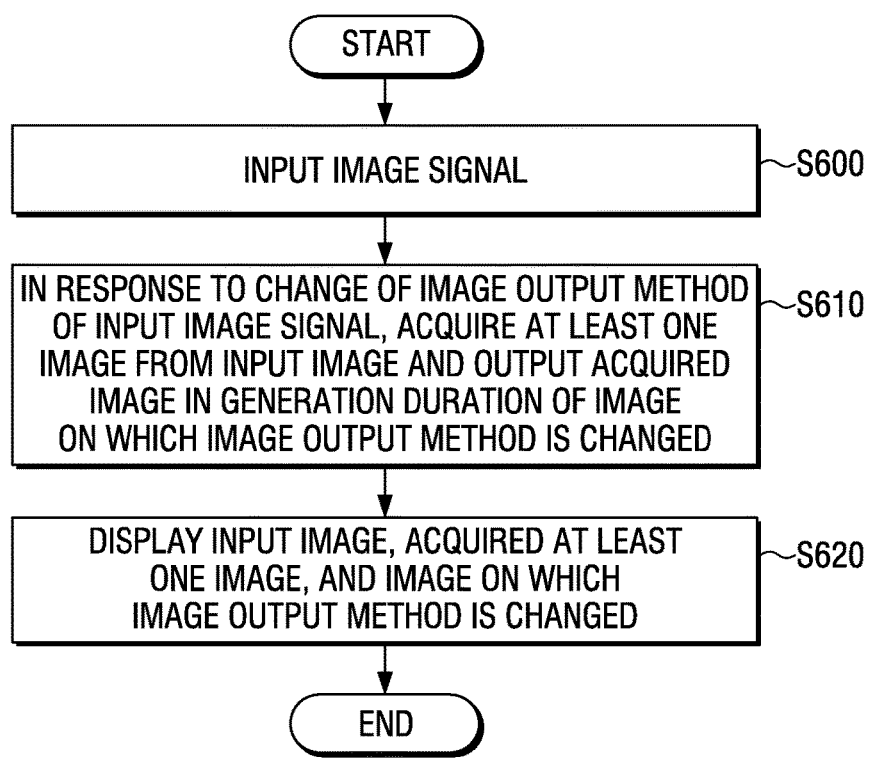

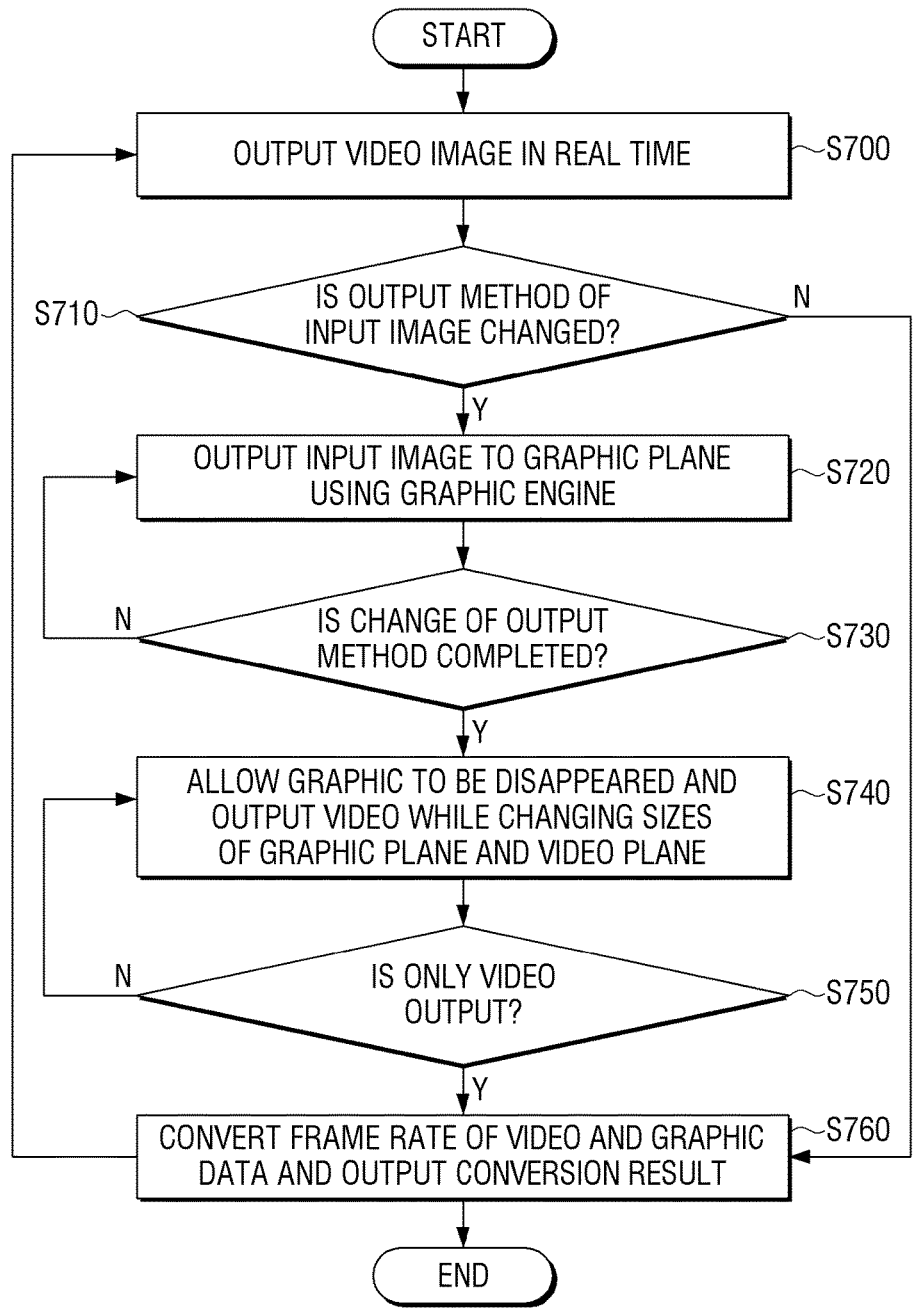

APPARATUS FOR DISPLAYING IMAGE, DRIVING METHOD THEREOF, AND METHOD FOR DISPLAYING IMAGE THAT ALLOWS A SCREEN TO BE NATURALLY CHANGED IN RESPONSE TO DISPLAYING AN IMAGE BY CHANGING A TWO-DIMENSIONAL IMAGE METHOD TO A THREE-DIMENSIONAL IMAGE METHOD

CROSS-REFERENCE TO RELATED APPLICATION

This application claims priority from Korean Patent Application No. 10-2014-0001425, filed on Jan. 6, 2014, in the Korean Intellectual Property Office, the disclosure of which is incorporated herein by reference in its entirety.

BACKGROUND

1. Field

Apparatuses and methods consistent with exemplary embodiments relate to an image display apparatus, a driving method thereof, and an image display method, and more particularly, to an image display apparatus which allows a screen to be naturally changed in response to displaying an image by changing a two-dimensional (2D) image to a three dimensional (3D) image or by changing a frame rate of the image, for example, in a digital television (DTV), a driving method thereof, and an image display method.

2. Description of the Related Art

Since integrated circuits (ICs) are attached to DTVs, and convert an input analog signal into a digital signal, the DTVs prevent deterioration in video and audio signals, and accurately restore the signals to remove dual screen and noise caused by reflection of an analog radio wave. Since the scan line of the DTVs is as many as 1050, the DTVs have a clear more detailed screen image as compared to analog TVs. In the DTVs, functions to configure a multi screen in which screens of two or three broadcasting stations are simultaneously shown on one TV screen using functions for storing and processing a broadcast signal of the DTVs, to stop and expand a spontaneous operation, to reproduce the stored operation again, or to print the stored operation through a printer become versatile.

In recent years, general DTVs enable watching of a 3D stereoscopic image or watching of an image by changing an image frequency according to surrounding environments. As a result, the DTVs change an output method for an image. For example, in response to a change of 3D driving from an off state to an on state in the DTV, since one image output in a screen in the off state has to be output as a left-eye image and a right-eye image, a change in the image output method is necessary.

In response to change of a stereoscopic image or an output frequency in the DTVs in the related art, since a size or frequency of an image output in a screen is changed, the video graphic is broken or disrupted and output. That is, the video or graphic which is being output when the change process of the image output method being viewed occurs is brokenly viewed or disruptedly presented. For example, all scan lines of the image may not be presented and an image transient occurs. To prevent the breakage or disruption in the related art, in response to a change of the image output method, the transient is prevented from being viewed using the video, graphic or panel mute type function.

However, the using mute method in the related art has a disadvantage whenever the output method is changed. Therefore, a black screen is viewed by a user for a mute period of time. As a result, the user has no choice but to watch the flickering of a screen in which the screen disappears and appears again.

Further, in response to an asynchronous operation of the mute function in the DTV operated in a multi-application, a developer manually performs tuning at mute timing to set the transient of the screen to not be shown, and thus it is cumbersome to the setting.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide an image display apparatus which allows a screen to be naturally changed in response to displaying an image by changing a 2D image method to a 3D image method or by changing a frame rate of the image, for example, in a digital television (DTV), a driving method thereof, and an image display method.

According to an aspect of an exemplary embodiment, there is provided an apparatus for displaying an image. The apparatus may include: an image input unit configured to allow an image signal to be input; an image processor configured to process the input image signal; and a display unit configured to display the processed image signal. The image processor may acquire at least one image from the input image and output the acquired image in a generation duration period of an image of which an image output method is changed in response to the change of the image output method of the input image signal.

The image processor may analyze the input image and determine the change of the image output method according to an analysis result.

The image processor may change the image output method from two-dimension (2D) image method to a 3D image method in response to it being determined that the 3D image is being produced as an analysis result of an image format of the input image.

The image processor may further include a user interface unit configured to receive a request for a change of the image output method from a user.

The image processor may include a video/audio processor configured to process video and audio of the input image signal, and a graphic user interface (GUI) processor configured to acquire the at least one image from the video/audio processor and use the acquired at least one image as a GUI image in response to the change of the image output method.

The image processor may generate an image to which an animation effect is added using the acquired at least one image and output the image in a duration time period between a point of time at which the acquired at least one image is first output to the display unit and a point of time at which the image, of which the image output method is changed, is output.

The image processor may further include a mixer configured to mix the acquired at least one image with an image output from the video/audio processor and output a mixing result to generate the image to which the animation effect is added while increasingly or continuously reducing a screen size or area occupied by the at least one image.

The mixer may overlay the acquired at least one image, constituting a different layer, with the image output from the video/audio processor.

The number of unit frames of the image to which the animation effect is added may be determined according to a frame rate of the display unit.

The image processor may further include a frame rate converter (FRC) configured to change frame rates of the input image and the image of which the image output method is changed and output a conversion result.

According to an aspect of an exemplary embodiment, there is provided a method of driving an image display apparatus. The method may include: allowing an image signal to be input; processing the input image signal; and displaying the processed image signal. The processing of the input image signal may include acquiring at least one image from images of the input image signal, and outputting the acquired image in a generation duration time period of an image of which an image output method is changed, in response to change of the image output method of the input image signal.

The outputting may include analyzing the input image and determining whether or not the image output method is changed according to an analysis result.

The outputting may include changing the image output method from a 2D image method to a 3D image method in response to the 3D image being determined as an analysis result of an image format of the input image.

The outputting may include receiving a request for the change of the image output method from a user.

The outputting may include processing video and audio of the input image signal in a video/audio processor; and acquiring at least one image from images processed in a graphic user interface (GUI) processor and using the acquired image as a GUI image, in response to the change of the image output method.

The outputting may include generating an image to which an animation effect is added using the acquired at least one image, and outputting the image to a screen of a display unit in a duration time period between a point of time at which the acquired at least one image is first output to the screen of the display unit and a point of time at which the image, of which the image output method is changed, is output.

The method may further include mixing the acquired at least one image with the image output from the video/audio processor and outputting a mixing result to generate the image to which the animation effect is added while increasingly reducing a size or area occupied by the at least one image.

The mixing may include overlaying the acquired at least one image, constituting a different layer, with the image output from the video/audio processor.

The number of unit frames of the image to which the animation effect is added may be determined according to a frame rate of the display unit.

The outputting may include changing frame rates of the input image and the image of which the image output method is changed and outputting a conversion result.

According to an aspect of an exemplary embodiment, there is provided a method of displaying an image. The method may include: outputting an input image signal to a screen; determining whether or not an image output method of the input image signal is changed; acquiring at least one image from the input image signal as a graphic user interface (GUI) image in response to the image output method being changed as a determination result; outputting the at least one image acquired as the GUI image; and outputting an image of which the image output method is changed in response to completion of change of the image output method.

The input image signal may be processed in and output from a video plane, and the at least one image acquired as the GUI image may be processed in and output from a graphic plane.

The outputting of the at least one image may include mixing the at least one image processed in the graphic plane and the image of which the image output method is changed and processed in the video plane, and outputting a mixing result.

A size or area of the first output GUI image occupied on the screen may be continuously or increasingly reduced until the change of the image output method is completed, in response to the change of the image output method.

The outputting of the at least one image may include generating an image to which an animation effect is added using the at least one image acquired as the GUI image, and outputting the image to which the animation effect is added onto the screen.

The image to which the animation effect is added may have the number of unit frames different from an image generated according to a frame rate of a display unit.

The outputting of the at least one image may include alternately mixing the at least one image with a left-eye image and a right-eye image of a changed 3D image to add the animation effect, and an overlaying region of the at least one image with the left-eye image and the right-eye may be increasingly or continuously reduced.

Additional aspects and advantages of the exemplary embodiments will be set forth in the detailed description, will be obvious from the detailed description, or may be learned by practicing the exemplary embodiments.

According to an aspect of an exemplary embodiment, there is provided a method including processing input images to produce an intermediate image between the input images for a changed output method within a time duration needed to receive a changed method input image of the changed output method when the output method of the input images is changed, and displaying the intermediate image.

According to an aspect of an exemplary embodiment, there is provided a method of driving an image display apparatus where the method may include changing an image processing method from a first type to a second type; creating a graphical user interface (GUI) image from a last full frame image of the first type; and using the GUI image in a transition from the last full frame image of the first type to at least a first full frame image of the second type. The transition may be a dissolve across plural frames of a beginning of images of the second type. The transition may also be an animation transition where the GUI image shrinks as the at least a first full frame image of the second type grows.

BRIEF DESCRIPTION OF THE DRAWING FIGURES

The above and/or other aspects will be more apparent by describing in detail exemplary embodiments, with reference to the accompanying drawings, in which:

FIG. 6 is a flowchart illustrating a driving process of an image display apparatus according to an exemplary embodiment; and FIG. 7 is a flowchart illustrating an image display method according to an exemplary embodiment.

DETAILED DESCRIPTION OF THE EXEMPLARY EMBODIMENTS

Figure 1:
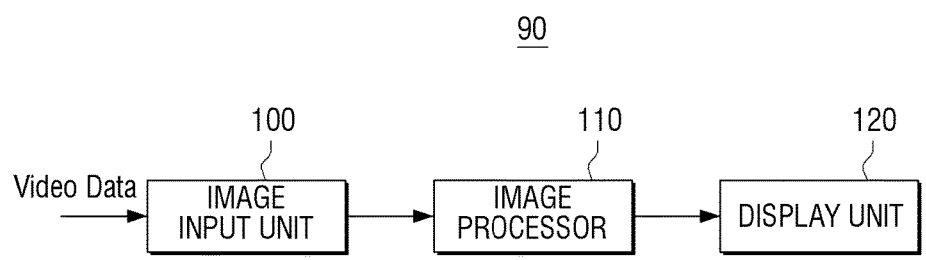
FIG. 1 is a block diagram illustrating a configuration of an image display apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a configuration of an image display apparatus according to an exemplary embodiment.

As illustrated in FIG. 1, an image display apparatus 90 according to an exemplary embodiment may partially or entirely include an image input unit 100, an image processor, 110, and a display unit 120, and the image display apparatus 90 may further include a user interface unit (not shown).

Here, the phase "partially or entirely include" may mean that the image display apparatus is configured to allow some components such as the image input unit 100 to be omitted or allow the image processor 110 to be integrated with other components such as the display unit 120. To facilitate understanding of the embodiments, the image display apparatus will be described to include all components in the embodiment.

The image input unit 100 receives various types of image signals. For example, the image input unit 100 may receive a broadcast signal from a broadcasting station. The image input unit 100 may be connected to a settop box to receive a broadcast signal. Further, the image input unit 100 may receive an image signal from various peripheral apparatuses such as a video cassette recorder (VCR) or a camcorder. For example, the image input unit 100 may be connected to an audio/video (A/V) terminal, a composite terminal, a component terminal, a high-definition multimedia interface (HDMI) terminal, or a radio frequency (RF) modulator terminal of a digital settop box to receive a digital broadcasting signal.

The image processor 110 processes the image signal input through the image input unit 100 and outputs a processing result to the display unit 120. In other words, the image processor 110 may scale the input image signal to match a standard of the display unit 120 or temporality store the image data scaled in the process. For example, the image processor 110 may additionally perform a process of generating a 3D image, for example, in response to a change of an image output method from a 2D image method to the 3D image method. Further, in response to input of an image signal of a 3D image format, the image processor 110 may perform an operation of processing the image signal.

In response to determining that a user requests a change of an image output method through a user interface unit, or determining that the image output method has to be changed as a result of an analysis of an image format of the input image in the process, the image processor 110 outputs the image using at least one image from the input image signal until the change of the image output method is completed. In other words, for example, in response to the change of the image output method from a 2D image method to a 3D image method, the image processor 110 may interrupt the output of the 2D image, which has been previously output, to change the image output method and image to the 3D image and 3D image method. At this time, the image processor 110 outputs the at least one image acquired from the input image signal, that is, the 2D image just before interruption to the display unit 120 through a different or other path. Here, the other path means a processing path for a GUI image processed to display the GUI image, such as a menu screen, for example, as a screen of the display unit 120. The GUI image is an image represented, for example, by a request of the user, and corresponds to a reference image, that is, an image represented by being overlaid on the 2D image or the 3D image.

An image output during the change of the image output method, that is, the GUI image may be one unit frame image or a plurality of unit frame images. Here, in response to using the plurality of unit frame images, the animation effect may be added to the image and the image to which the animation or transition effect is added may be output. In other words, the GUI image is displayed in an entire screen and then gradually disappears. That is, the displayed image dissolves or transitions from the GUI image to the new image of the new output method. Alternatively, a new image, of which the image output method is changed, is gradually displayed or appears in response to a size or the disappearing GUI image. Therefore, finally, only the new image is displayed on the screen in response to completion of the change of the image output method. The number of acquired unit frame images or the number of unit frame images generated using one unit frame image acquired in response to the change of the image output method may be determined according to a frame rate of the display unit 120.

More specifically, the image processor 110 processes an image output to the display unit 120 through two paths. In response to the image output method being not additionally changed, the image processor 110 processes data through general video and audio processing paths. However, in response to change of the image output method, a preparing process for outputting video and audio, specifically, the video according to the changed image output method is necessary. In the duration of the preparing process, the image processor outputs an additional unit frame image acquired just before the change of the image output method in the processing process of the image signal to the display unit 120 through a path different from the processing paths of the video and audio. Thus, a transient of the screen, that is, a change process of the screen is not exposed or presented to the user. Other detailed contents will be described later.

The display unit 120 outputs the image processed in the image processor 110. In other words, in response to processing a 2D mage in the image processor 110, the display unit 120 outputs the processed 2D image. In response to changing the 2D image to a 3D image and outputting the 3D image, the display unit 120 outputs a transient prevention image that allows the transient not to be shown or displayed to the user during the change process, that is, a 2D GUI image, and then outputs the 3D image. In the exemplary embodiment, even in response to simply changing a frame rate of the 2D image or the 3D image, the display unit 120 outputs the GUI image just before the change of the frame rate. The GUI image may be one unit frame image or a plurality of unit frame images to which the animation effect is added. Here, the animation effect means that while the GUI image gradually disappears, the image of which the image output method is changed gradually appears at the size of the disappeared image. However, the s not limited thereto.

Figure 2:
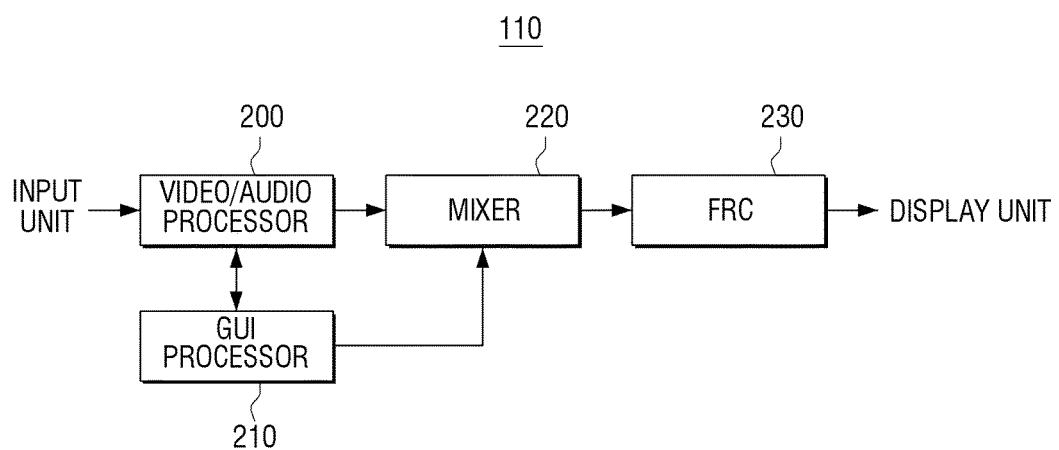
FIG. 2 is a block diagram illustrating an image processor of FIG. 1.
Figure 3:
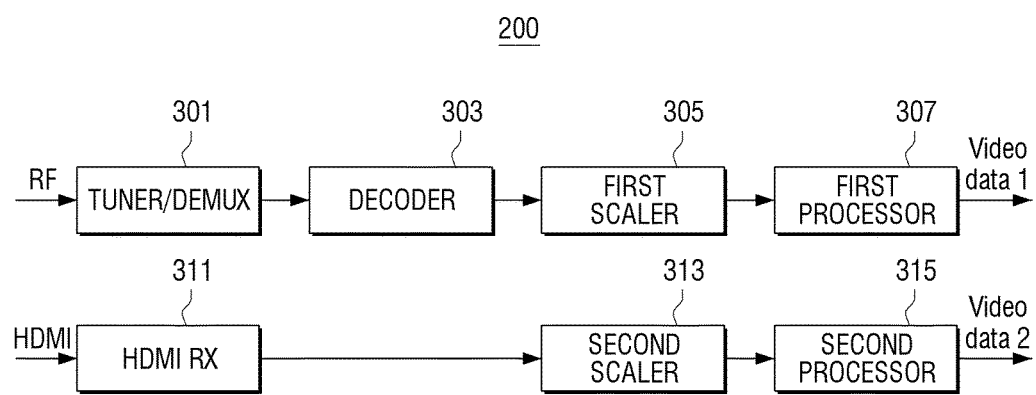
FIG. 3 is view illustrating a detailed configuration of a video/audio processor of FIG. 2.

FIG. 2 is a block diagram illustrating the image processor 110 of FIG. 1, and FIG. 3 is a block diagram illustrating a video/audio processor of FIG. 2. The image processor 110 illustrated in FIG. 2 will be described, for example, under the assumption that the image input unit 100 of FIG. 1 directly receives a broadcast signal from a broadcasting station or the image input unit 100 is directly connected to a VCR or a camcorder.

As illustrated in FIG. 2, the image processor 110 of FIG. 1 according to an exemplary embodiment may partially or entirely include a video/audio processor 200, a GUI processor 210, a mixer 220, and a frame rate controller (FRC) 230.

Here, the phase "partially or entirely include" may mean that the image processor 110 is configured to allow some components such as the mixer 220 and the FRC 230 to be omitted or allow some components such as the mixer 220 are integrated with other components such as the FRC 230. To facilitate understanding of the embodiments, the image processor will be described to include all components in the embodiment.

First, the video/audio processor 200 may have a configuration to process a radio frequency (RF) signal and a configuration to process a high-definition multimedia interface (HDMI) signal as illustrated in FIG. 3. In response to the RF signal such as the broadcast signal, the video/audio processor 200 may partially or entirely include a tuner/demultiplexer (DMUX) 301, a decoder 303, a first scaler 305, and a first processor 307 which perform operations such as tuning, demultipexing, decoding, or scaling, and in response to the HDMI signal, the video/audio processor 200 may partially or entirely include a HDMI receiver (Rx) 311, a second scaler 313, and a second processor 315 which perform operations such as reception of the HDMI signal, or scaling of the received HDMI signal.

Here, the tuner/DEMUX 301 selects a channel desired by the user, divides video and audio signals of the selected channel, and outputs the divided video and audio signals. The decoder 303 decodes an input encoded signal and outputs the decoded signal to the first scaler 305. The first scaler 305 may perform an operation, for example, such as bit conversion of an 8-bit video signal. The first processor 307 controls the first scaler 305 to output a scaled signal. The HDMI Rx 311 receives the HDMI signal, the second scaler 313 scales a signal provided from the HDMI Rx 311, and the second processor 315 controls the second scaler 313 to output the scaled HDMI signal.

The GUI processor 210 operates under two conditions. In other words, in response to no-change or lack of the image output method, the GUI processor 210 generates a GUI image and provides the generated GUI image to the mixer 220 to display the GUI image, such as a menu screen, together with the image processed in the video/audio processor 200. In response to a change of the image output method, the GUI processor 210 acquires at least one unit frame image processed in the video/audio processor 200 just before the start of the change of the image output method and uses the acquired unit frame image as the GUI image. Here, the using of the GUI image means to process the acquired image and output the processed image. For example, in response to processing one unit frame image, the GUI processor may directly provide the acquired image as the GUI image to the mixer 220. However, in response to processing a plurality of unit frame images, the GUI processor may process the acquired image to add the animation effect. Further, the GUI processor 210 may generate the plurality of unit frame images by slightly shifting the acquired one unit frame image using the acquired one unit frame image. Here, the plurality of unit frame images may be processed and generated through adjustment in a size of the GUI image occupied in the screen.

The mixer 220 may mix the video image provided from the video/audio processor 200 with the GUI image processed in the GUI processor 210. Here, the mixing means that a background image, a video image, and a GUI image located in different layers are overlaid with each other. In other words, the video image in a second layer is overlaid on the background image located in a first layer, and the GUI image in a third layer is overlaid on the video image again. Therefore, a region other than a portion in which the images are displayed may be transparently processed. Here, the GUI image may be a menu screen generated in the GUI processor 210. The GUI image may be an image acquired in the video/audio processor 200 in response to change of the image output method, that is, just before the change of the image output method, a processed image of the acquired image, or a newly generated image. However, the mixer 220 may sufficiently mix images in a single layer, and thus the embodiments are not limited thereto.

The FRC 230 converts a frame rate of an input image and outputs the conversion result. For example, the frame rate may be changed by a separate request of the user or based on an image analysis performed in the video/audio processor 200 under control of the video/audio processor 200. Further, the FRC 230 may automatically convert the frame rate of the input image based on the frame rate of the display unit 120. For example, under the assumption that a moving image is reproduced, the frame rate of the image in the FRC 230 may be reduced in response to repetition of a still image as an analysis result of the plurality of input unit frame images in the video/audio processor 200. In response to a moving image being analyzed during reproducing of a still image, the frame rate of the image in the FRC 230 may be increased. The change of the frame rate may be also included in the change of the image output method.

Figure 4:
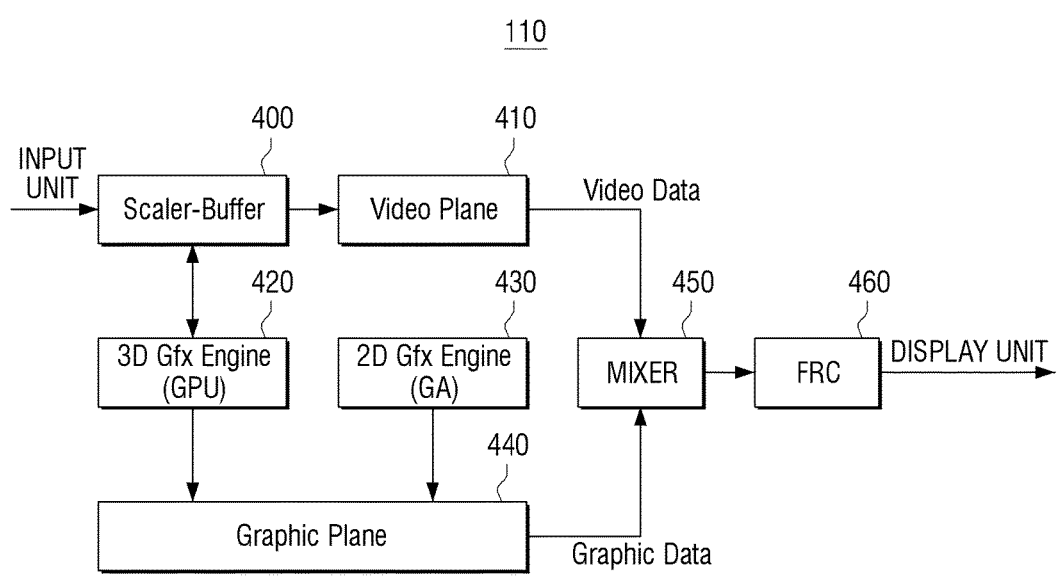
FIG. 4 is a block diagram illustrating the image processor of FIG. 1 according to another exemplary embodiment.

FIG. 4 is a block diagram illustrating the image processor of FIG. 1 according to another exemplary embodiment. The image processor 110 of the image display apparatus 90 connected to an image reception apparatus such as a settop box is assumed.

Referring to FIG. 4 with FIG. 1, the image processor 110 according to another exemplary embodiment may partially or entirely include a scaler/buffer 400, a video plane 410, a 3D engine unit 420, a 2D engine unit 430, a graphic plane 440, a mixer 450, and an FRC 460. Here, the phrase "partially or entirely include" has the same meaning as the above-described phrase.

The scaler/buffer 400 may perform a bit conversion operation such as scaling of an image of an image signal input through the image input unit 100 of FIG. 1, and the scaled image data may be temporarily stored in and then output from the buffer. The bit conversion indicates, for example, a process such as conversion of 8-bit R, G, and B data to 6-bit R, G, and B data to represent or produce a resolution suitable for the display unit 120 of FIG. 1.

The video plane 410 may correspond to a kind of processor (or a controller). Merely, the video plane 410 may be slightly different from the processor in that software (S/W) or an application stored in an internal memory is executed to execute a specific operation. The video plane 410 controls the scaler/buffer 400 to output scaled image data to the mixer 450. At this time, the image data may be provided in frame units. Further, the video plane 410 may be involved in image generation. For example, to this end, the video plane 410 may include an image generation unit (not shown) configured to generate a 3D image therein or may be interlocked with an image generation unit (not shown) located outside the video plane 410. Further, the video plane 410 may analyze the input image signal and obtain information for a frame rate of a specific image. Then, the corresponding information may be transferred to the FRC 460. For the operation, the video plane 410 may be variously modified. However, the modification may be specifically limited in the exemplary embodiment.

The 3D engine unit 420 and the 2D engine unit 430 are involved in processing a menu screen in a 2D or 3D graphic. To this end, the 3D engine unit 420 and the 2D engine unit 430 may execute applications stored therein. In other words, the 3D engine unit 420 and the 2D engine unit 430 operate according to whether a 2D image or a 3D image is displayed on a screen of the display unit 120 (see FIG. 1), and output a generated graphic, for example, a menu screen. FIG. 4 illustrates, as one example, that the 3D engine unit 420 is connected to the scaler/buffer 400. However, in response to a change of an output method of an image displayed in the screen of the display unit 120, at least one of the 3D engine unit 420 and the 2D engine unit 430 may acquire an image just before the change of the image output method from the scaler/buffer 400, and use the acquired image. The acquired image is provided to the mixer 450 under control of the graphic plane 440 directly or through a separate processing process. Here, the separate process means a process of adding an animation effect.

The graphic plane 440 is also a kind of processor like the video plane 410, and may control the 3D engine unit 420 or the 2D engine unit 430 according to whether the 2D image or the 3D image is displayed on the screen of the display unit 120. Further, the graphic plane 440 receives a graphic generated in the 3D engine unit 420 or the 2D engine unit 430 and provides the graphic to the mixer 450.

The mixer 450 mixes video data provided from the video plane 410 with graphic data provided from the graphic plane 460 and provides the mixed image to the FRC 440. The FRC 460 converts the mixed image to a frame rate suitable for the display unit 120 of FIG. 1 and outputs a conversion result. The detailed contents have been sufficiently described in advance, and thus detailed description will be omitted.

According to the exemplary embodiment, the image display apparatus 90 may remove a need for a panel mute, for example, through the use of a graphic engine mounted as one module of a digital television (DTV) even in response to change of the image output method.

In the exemplary embodiment, since the mute does not exist, and a black screen which causes flicker in the related art is not viewed to the user, the user may watch a clean or noise free screen.

Figure 5A:
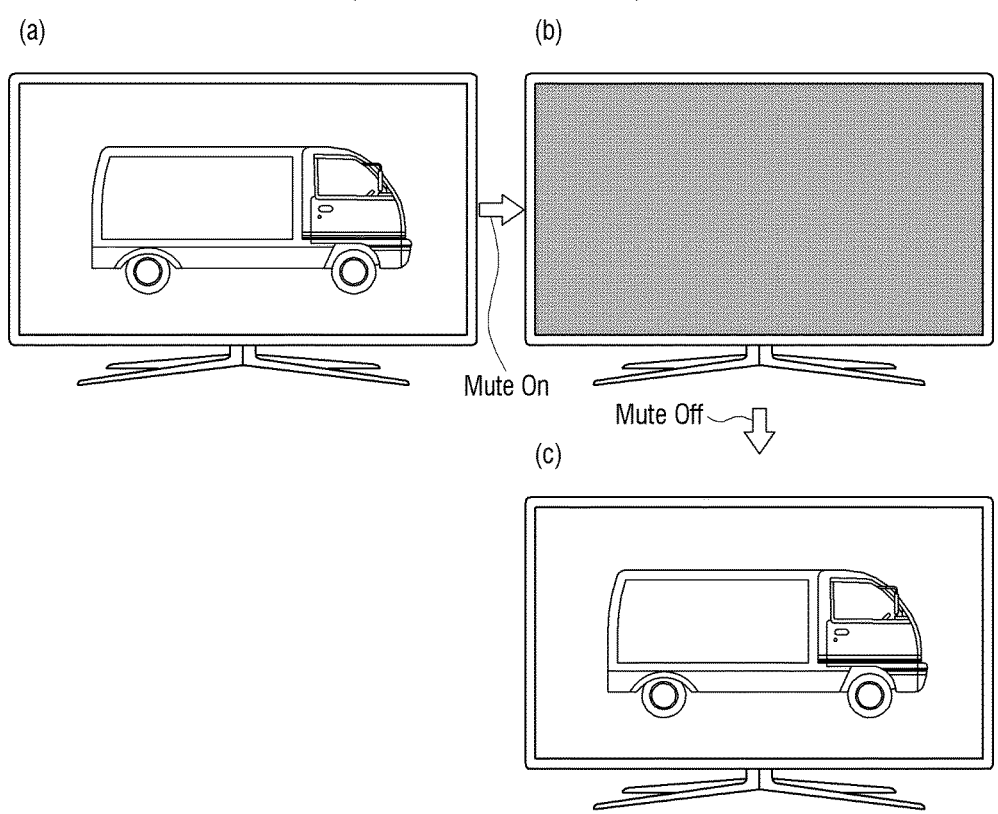
FIGS. 5A and 5B are views comparatively illustrating implementation states of screens in the related art and in the exemplary embodiment.
Figure 5B:
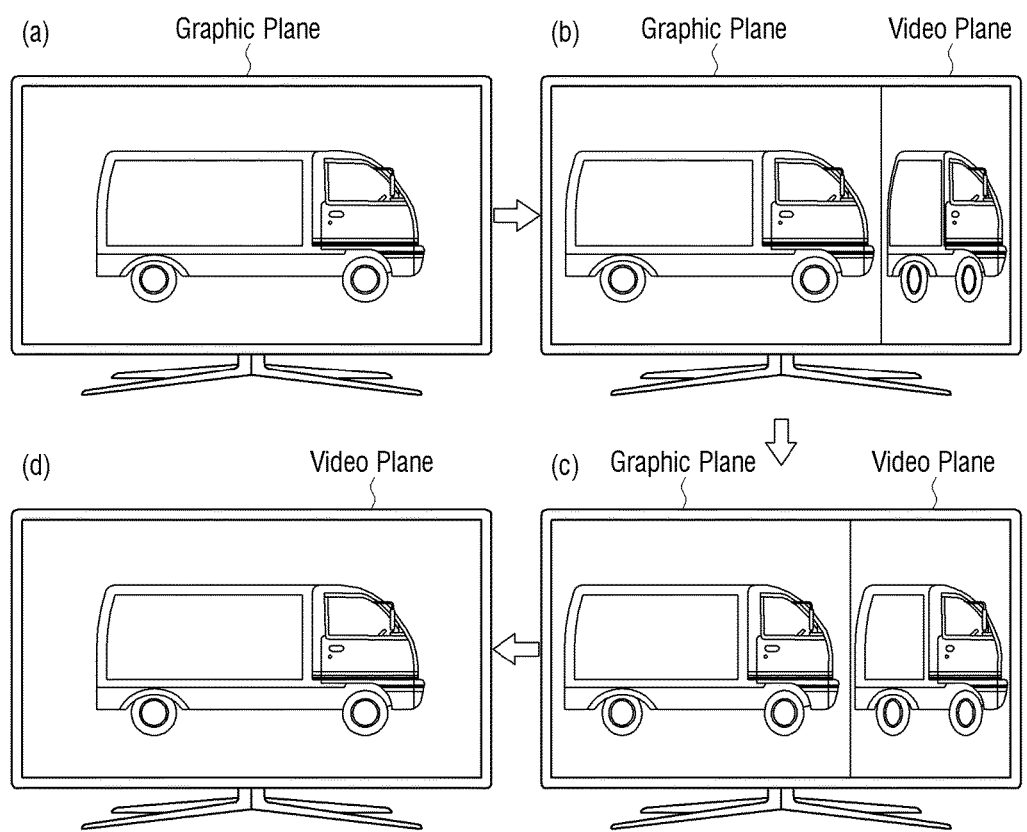

FIGS. 5A and 5B are views comparatively illustrating implementation states of screens in the related art and the exemplary embodiment.

Referring to FIGS. 5A and 5B, in response to a change of an image output method in the related art as illustrated in FIG. 5A, a black screen may be inserted in the image output method changing process as illustrated in FIG. 5A (b). However, in the exemplary embodiment, in response to change of an image output method as illustrated in FIG. 5B, an image to which an animation effect is added may be output in the image output method changing process as illustrated in FIGS. 5A (b) and (c). Further, an image corresponding to approximately an intermediate point of time between the beginning of the change of the image output method and the completion of the change of the image output method may be output and naturalness may be added to a change in the screen without addition of the animation effect.

As a result, the user may recognize a screen change state of the screen, that is, a transient state through generation of the black screen as illustrated in FIG. 5A. However, the user may not recognize the transient state due to the natural change of the screen in FIG. 5B. Further, in the exemplary embodiment, the image processing method of adding the animation effect is presented as the preferred embodiment, but the embodiments are not limited thereto.

To add the animation effect according to an exemplary embodiment, FIGS. 5B (b) and (c) illustrate that only two unit frames are used, but the use of the unit frame may be variously changed. For example, in response to an operation frequency of, for example, 50 Hz of the display unit 120 of FIG. 1, and a time of approximately 1 second necessary from the beginning of the change of the image output method to the completion of the change of the image output method, the display unit 120 displays an image of 50 frames per 1 second on the screen. Therefore, an initial image may be included between FIGS. 5B (a) and (d), and 49 unit frame images other than a last image may be displayed.

Further, in response to changing only a frame rate with respect to the input 2D image in FIG. 5B, images corresponding to video planes in FIGS. 5B (b) and (c) may be 2D images, and images corresponding to graphic planes of an upper-side layer thereof may be gradually reduced in size. In response to changing the image output method from a 2D image to a 3D image, the images corresponding to the video planes in FIGS. 5B (b) and (c) may be a left-eye image and a right-eye image, and the sizes of the images corresponding to the graphic planes of the upper-side layer thereof may be gradually reduced while the left-eye image and the right-eye image are alternately output.

FIG. 6 is a flowchart illustrating a driving process of an image display apparatus according to an exemplary embodiment.

For convenience of description, referring to FIG. 6 with FIG. 1, the image display apparatus 90 according to an exemplary embodiment receives an image signal from a broadcasting station or a peripheral apparatus such as a VCR or a camcorder (S600).

In response to a change of an image output method of images of the input image signal, the image display apparatus 90 acquires at least one image from the images of the input image signal and outputs the acquired image in a generation duration of an image of which the image output method is changed (S610).

Here, the acquired at least one image corresponds to an image before the change of the image output method, and the generation duration of the image of which the image output method is changed means a time duration from a point of time at which the image changed according to the change of the image output method starts to be generated to a point of time at which generation of an image changed to first display the image on the screen is completed. However, in the exemplary embodiment, the points of time are not limited thereto.

In other words, in response to the request of the user, the request time may be a start point of time, and a point of time in which the image output method is changed by analyzing an image format may be a start point of time. The completion point of time may not be a point of time in which an image to be first displayed on the screen is generated but a point of time in which all the plurality of unit frame images are generated according to a preset value. In addition, a point of time in which a new image, of which an image output method is changed, is output after the plurality of generated unit frame images are displayed may be determined as the completion point of time.

The image display apparatus 90 displays the input image, the acquired at least one image, and the image of which the image output method is changed on a screen (S620).

In other words, the image display apparatus 90 directly outputs the input image to the screen in response to non-change of the image output method, and the image display apparatus 90 outputs the at least one image acquired at a corresponding point of time and simultaneously displays the image of which the image output method is changed in response to change of the image output method.

At this time, in response to output of a plurality of images, an animation effect may be added to the at least one image, and the image to which the animation effect is added may output so that a size of an image acquired and output at a point of time in which the image output method is changed is gradually reduced, and a size of a new image of which the image output method is changed is gradually increased.

FIG. 7 is a flowchart illustrating an image display method according to an exemplary embodiment.

For convenience of description, referring to FIG. 7 with FIGS. 1 and 4, the image display apparatus 90 according to an exemplary embodiment outputs an input video image in real time (S700). At this time, the input video image may be a 2D image or a 3D image, but in the exemplary embodiment, the input video image may be the 2D image.

In the process, the image display apparatus 90 determines whether or not an output method of the input video image is changed. To this end, the image display apparatus 90 may determine whether or not the user separately requests the change of the image output method, and analyze a format of the input video image. At this time, the analysis of the image format may be performed in response to change of a program or periodically at certain time intervals. For example, the format of the 3D image includes side by side, top and bottom, frame packing, or the like.

In response to a change of the image output method, the image display apparatus 90 outputs the input video image to the graphic plane 440 using a graphic engine (S720). The process corresponds to a process of acquiring an image from the input video image and first outputting the acquired image.

Subsequently, the image display apparatus 90 determines whether or not the change of the image output method is completed (S730). For example, to output a 2D image as a 3D image, the image display apparatus 90 determines a point of time in which a pair of left-eye image and right-eye image are first generated and determines whether or not the change of the image output method is completed. Alternatively, the image display apparatus 90 may determine a point of time in which a unit frame image is generated to be suitable for a frame rate of the display unit 120 by a preset value as the completion point of time.

In response to the change of the image output method not being completed, for example, the image display apparatus 90 may output an acquired image by selecting one of a plurality of frame images acquired at the beginning of the change of the image output method. Alternatively, the image display apparatus 90 may provide a unit frame image generated by slightly shifting the unit frame image acquired at the beginning of the change of the image output method until the change of the image output method is completed, to the graphic plane 440 as a GUI image.

In the processes, in response to the completion of the change of the image output method, the image display apparatus 90 outputs the video image of the video plane 410 and the GUI image of the graphic plane 440 to a screen while the image display apparatus mutually change sizes (grows/ shrinks) of the video image of the video plane 410 and the GUI image of the graphic plane 440 (S740). For example, in one screen, the size of the GUI image is gradually reduced or shrinks, and the size of the newly generated video image is gradually increased or grows.

In response to all the video images for outputting, for example, a 3D image finally newly generated by gradually changing the size being not output (or generated), the image display apparatus 90 may repeat operation S740. However, in response to only both the left-eye video image and the right-eye video image being output (or generated), the image display apparatus 90 may additionally convert frame rates of the video data and the graphic data and output a conversion result (S750 and S760). Here, in response to the output being described in terms of the display unit 120 or the mixer 220 of FIG. 2, the generation is described only in terms of the mixer 220 of FIG. 2.

In brief, in FIG. 7, the image display apparatus 90 outputs the input video image in real time. At this time, in response to a non-change of the output method of the input video image, the image display apparatus 90 converts the input video image to be suitable for the frame rate of the display unit 120 and outputs a conversion result.

In the process, in response to the change of the output method of the input video image, the image display apparatus 90 may acquire at least one image from the input video image using the graphic engine until the change of the input output method is completed and output the acquired image as the GUI image, or output the GUI images newly generated by adding the animation effect using the acquired image.

In the process, the image display apparatus 90 may determine that the change of the image output method is completed in response to outputting the image in which the image output method is changed, for example, both the left-eye image and the right-eye image for a 3D implementation, and then interrupt the output of the GUI image.

The image display apparatus 90 may output only the image of which the image output method is changed. Further, in response to the graphic data, such as a menu screen, the image display apparatus 90 may mix the image of which the image output method is changed with the graphic data and output a mixing result, and further the display apparatus 90 may convert the frame rate of the mixed image and output a conversion result.

Therefore, based on the above description, operations S730 and S750 in FIG. 7 may be understood as the same concept.

However, strictly speaking, operations S730 and S750 may have a difference in that operation S730 may be determined according to whether the initial image of which the image output method is changed is generated or whether or not the image is generated by a number of frames preset according to a intention of a system designer, and operation S750 may be determined according to the point of time in which only the initial image, of which the image output method is finally changed through addition of the animation effect, is generated or the point of time in which the initial image is displayed on the screen.

In other words, for example, in response to generating the GUI image generated by the preset number of frames equal to the frame rate of the display unit 120 of FIG. 1 using the acquired unit frame image, this corresponds to completion of the change of the image output method like operation S730. Further, in response to outputting only the image of which the image output method is changed in the outputting of the image of which the image output method is changed by adding the animation effect using the generated GUI images, this corresponds to output of all the video images like operation S750.

Therefore, based on the above description, since the exemplary embodiment may be freely changed according to the intention of a system designer, the embodiments are not limited thereto. However, the operations are common in that the GUI image is displayed on the screen of the display unit 120 at a point of time in which the image output method is changed.

Even when the image display apparatus has been described that all components constituting the exemplary embodiment are integrally combined or integrally combined to operate, the embodiments are not limited thereto. That is, even within the objection of the embodiments, at least two of the all the components may be selectively combined to operate. Further, all the components may be individually implemented in hardware, but the components may be implemented in a computer program having a program module in which partial or all components are selectively combined and one piece of computer hardware or a plurality of pieces of computer hardware performs portions of combined functions or all the combined functions. Codes and code segments constituting the computer program may be easily inferred by those skilled in the art. The computer program may be stored in non-transitory computer readable media, and read and executed by a computer so that the exemplary embodiment may be implemented.

The non-transitory computer-recordable medium is not a medium configured to temporarily store data such as a register, a cache, or a memory but an apparatus-readable medium configured to semi-permanently store data. Specifically, the programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

The foregoing exemplary embodiments and advantages are merely exemplary and are not to be construed as limiting the embodiments. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An apparatus of displaying an image, the apparatus comprising:
   an image input receiver configured to allow an image signal to be input as an input image signal;
   an image processor configured to process the input image signal to produce a processed image signal in accordance with a first image output method;
   a display configured to display the processed image signal; and
   a controller configured to control the image processor,
   wherein the image processor comprises a graphic user interface (GUI) processor, and
   wherein the controller, when the first image output method of the input image signal is changed to a second image output method, controls the GUI processor to acquire at least one image from the input image signal before the change of the image output method, output the acquired at least one image as a GUI image while a first image of the input image signal to be displayed according to the second image output method is generated by the image processor, and stop outputting the acquired image as the GUI image when the first image according to the second image output method is displayed,
   wherein the acquired at least one image is displayed on a first layer different from a second layer on which the first image is displayed.

2. The apparatus as claimed in claim 1, wherein the image processor analyzes an input image and determines whether the image output method is changed according to an analysis result.

3. The apparatus as claimed in claim 1, wherein the image processor changes the image output method from a two-dimension (2D) image output method to a 3D image output method in response to an analysis result of an image format of the input image being a 3D format.

4. The apparatus as claimed in claim 1, wherein the image processor further includes a user input receiver to receive a request for a change of the image output method from a user.

5. The apparatus as claimed in claim 1, wherein the image processor further includes:
   a video/audio processor configured to process video and audio of the input image signal,
   wherein the GUI processor is configured to acquire the at least one image from the video/audio processor as an acquired at least one image and use the acquired at least one image as the GUI image when the image output method is changed.

6. The apparatus as claimed in claim 5, wherein the image processor generates an animation image to which an animation effect is added using the acquired at least one image in a duration time period between a point of time at which the acquired at least one image is first output to the display and a point of time at which the image according to the second image output method, is output and outputs the animation image to which the animation effect is added.

7. The apparatus as claimed in claim 6, wherein the image processor further includes a mixer configured to mix the acquired at least one image with a video image output from the video/audio processor and output a mixing result while increasingly reducing a size occupied by the at least one image, to generate the animation image to which the animation effect is added.

8. The apparatus as claimed in claim 7, wherein the mixer overlays the acquired at least one image on the first layer with the video image, output from the video/audio processor, which is displayed on the second layer.

9. The apparatus as claimed in claim 6, wherein a number of unit frames of the animation image to which the animation effect is added is determined according to a frame rate of the display.

10. The apparatus as claimed in claim 1, wherein the image processor further includes a frame rate converter (FRC) configured to change frame rates of the at least one input image and the image output according to the second image output method and output a conversion result.

11. A method of driving an image display apparatus, the method comprising:
   allowing an image signal to be input as an input image signal;
   processing the input image signal according to a first image output to produce a processed image signal; and
   displaying the processed image signal,
   wherein the processing of the input image signal according to a first image output, when the first image output method of the input image signal is changed to the second image output method, includes acquiring, through a graphic user interface (GUI) processor, at least one image from images of the input image signal before the change of the image output method outputting the acquired at least one image as a GUI image while a first image of the input image signal to be displayed according to the second image output method is generated, and stopping outputting the acquired image as the GUI image when the first image according to the second image output method is displayed,
   wherein the acquired at least one image is displayed on a first layer different from a second layer on which the first image is displayed.

12. The method as claimed in claim 11, wherein the outputting includes analyzing an input image and determining whether the image output method is changed according to an analysis result.

13. The method as claimed in claim 11, wherein the outputting includes changing the image output method from a 2D image output method to a 3D image output method in response as an analysis result of an image format of the input image being a 3D format.

14. The method as claimed in claim 11, wherein the outputting further includes receiving a request for a change of the image output method from a user.

15. The method as claimed in claim 11, wherein the outputting further includes:
   processing video and audio of the input image signal in a video/audio processor,
   wherein the acquiring the at least one image comprises acquiring the at least one image from images processed in the GUI processor as an acquired image and using the acquired image as the GUI image, in response to change of the image output method.

16. The method as claimed in claim 15, wherein the outputting includes generating an animation image to which an animation effect is added using the acquired at least one image, and outputting the animation image to a screen of a display in a duration time period between a point of time at which the acquired at least one image is first output to the screen of the display and a point of time at which the image according to the second image output method is output.

17. The method as claimed in claim 16, further comprising mixing the acquired at least one image with a video image output from the video/audio processor and outputting a mixing result to generate the animation image to which the animation effect is added while increasingly reducing a size occupied by the at least one image.

18. The method as claimed in claim 17, wherein the mixing includes overlaying the acquired at least one image on the first layer with the video image, output from the video/audio processor, which is displayed on the second layer.

19. The method as claimed in claim 16, wherein a number of unit frames of the animation image to which the animation effect is added is determined according to a frame rate of the display.

20. The method as claimed in claim 11, wherein the outputting includes changing frame rates of the at least one input image and the image output according to the second image output method and outputting a conversion result.

* * * * *